United States Patent Office 3,806,514
Patented Apr. 23, 1974

3,806,514
1-PHOSPHORYLATED BENZIMIDAZOLES
John Hannah, Matawan, Edward F. Rogers, Middletown, and Donald W. Graham, Mountainside, N.J., assignors to Merck & Co., Inc., Rahway, N.J.
No Drawing. Filed Feb. 16, 1972, Ser. No. 226,976
Int. Cl. C07d 49/38
U.S. Cl. 260—302 E                    9 Claims

ABSTRACT OF THE DISCLOSURE

2 - arylbenzimidazoles and 2 - heteroarylbenzimidazoles phosphorylated in the 1-position and optionally substituted in the 5(6)-position are employed as anthelmintic agents and as fungicides.

---

The invention relates to new compositions of matter classifiable in the field of organic chemistry as N-phosphorylated benzimidazoles. More particularly, this invention relates to benzimidazoles phosphorylated at the 1-position and having an aryl or heteroaryl radical at the 2-position and, optionally, being further substituted at the 5(6)-position; to methods for preparing such benzimidazoles; and to methods for employing them as fungicides and as anthelmintics in the treatment and control of helminthiasis.

In its composition aspect, therefore, the instant invention may be described as residing in the concept of N-phosphorylated benzimidazoles of the following structural formula:

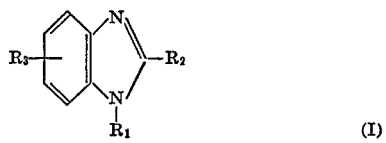

wherein:

$R_2$ is a member selected from the group consisting of aryl, orthofluoroaryl and a five or six membered monocyclic heteroaromatic radical containing from 1 to 3 hetero atoms selected from the group consisting of oxygen, nitrogen and sulfur, provided that the nitrogen containing heteroaromatic radicals do not contain an

group;
$R_3$ is in the 5(6)-position of the molecule and is a member selected from the group consisting of hydrogen and

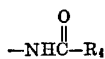

$R_4$ is a member of the group consisting of loweralkoxy, phenyl and parafluorophenyl;
$R_1$ is a member selected from the group consisting of:

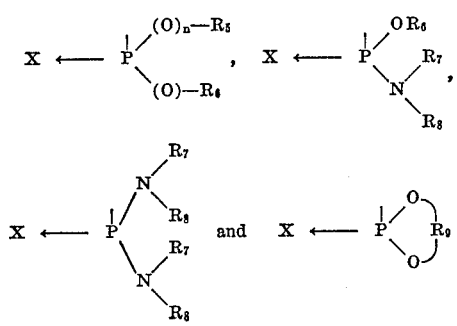

$n$ is a whole number from 0 to 1;
$R_5$ is a member selected from the group consisting of alkyl and aryl;
$R_6$ is a member selected from the group consisting of alkyl, aryl, an alkali metal, ammonium and loweralkyl ammonium;
$R_7$ and $R_8$ are members selected from the group consisting of hydrogen and loweralkyl, provided that at least one of $R_7$ and $R_8$ is loweralkyl;
$R_9$ is a loweralkylene radical; and
X is a member selected from the group consisting of oxygen and sulfur, provided that when X is sulfur $R_3$ is hydrogen.

As used above in defining the symbols $R_2$, $R_4$, $R_5$, $R_6$, $R_7$, $R_8$ and $R_9$, the term, aryl, is intended to include aryl radicals such as phenyl and naphthyl. The term, heteroaromatic radical, is intended to include heteroaromatic radicals containing one hetero atom in the ring structure such as thienyl, furyl and pyridyl; heteroaromatic radicals containing two hetero atoms in the ring structure such as thiazolyl, isothiazolyl, pyrazinyl, 1-pyrazolyl and oxazolyl; and heteroaromatic radicals containing three hetero atoms in the ring structure such as thiadiazolyl. Preferred, are five membered heteoraromatic radicals containing nitrogen and sulfur; the most preferred heteroaromatic radical being thiazolyl. The term, alkyl, is intended to include both straight and branched chain alkyl groups containing from 2 to 10 carbon atoms such as for example, ethyl, isopropyl, pentyl, n-octyl, n-decyl, and the like, and the term, loweralkyl, is intended to include such alkyl groups having from 1-6 carbon atoms. The term, loweralkylene, is intended to include loweralkylene radicals containing from 2 to 4 carbon atoms such as ethylene, propylene and butylene. The term, loweralkoxy is intended to include straight and branched chain loweralkoxy groups containing from 1 to 6 carbon atoms in the alkyl moiety such as methoxy, ethoxy, isopropoxy, butoxy, hexyloxy and the like. The term, alkali metal, is intended to include the alkali metals such as lithium, sodium and potassium. The term, loweralkyl ammonium, will include mono-, di-, tri- and tetra-loweralkyl ammonium radicals, such as, for example, ethylammonium, methylammonium, diethylammonium, tetramethylammonium and the like.

The instant invention is based upon applicants' discovery that the N-phosphorylated benzimidazoles described above show inherent applied use characteristics as anthelmintic agents and as fungicides. The physiological activity of the N-phosphorylated benzimidazoles of this invention has been confirmed by standard laboratory techniques. Moreover, it has been found that the N-phosphorylated benzimidazoles of this invention display water or lipid solubility superior to the parent unphosphorylated benzimidazole and are highly useful where liquid formulations are desired or where water or lipid solubility is important to delivery of the active agent. It is contemplated that formulations containing the N-phosphorylated benzimidazoles of this invention as the essential active ingredient will be employed in the treatment and control of helminthiasis and as fungicides.

In general, the 1-phosphinyl benzimidazoles of this invention, i.e. those compounds of the instant invention wherein X is oxygen, may be prepared readily from the parent 1-unsubstituted benzimidazole, wherein $R_2$ and $R_3$ are as defined above, by first forming an alkali metal salt of the parent benzimidazole and then adding the desired phosphinyl group at the 1-position by treating the benzimidazole alkali metal salt with the phosphorylating agents hereinafter described. It will be recognized that the starting 1-unsubstituted benzimidazoles employed in the process described above are well-known compounds and are either available commercially or may be readily prepared by techniques already fully described in the chemical literature.

Conveniently, the alkali metal salt of the starting benzimidazole is formed by treating a suspension of the benzimidazole in a suitable organic solvent, desirably a loweralkanol such as methanol, ethanol, propanol, butanol, and the like, with an alkali metal alkoxide such as, for example, sodium methoxide, sodium butoxide, potassium methoxide, or lithium ethoxide under reflux for about 20 to 60 minutes. Desirably the reaction is carried out under an inert atmosphere. Upon completion of the reflux period, the solvent is removed from the reaction mixture by distillation under reduced pressure and the salt may be separated from the residue by filtration and dried.

The benzimidazole alkali metal salt so formed may then be treated with a suitable phosphorylating agent in order to introduce the desired phosphinyl grouping at the 1-position. The phosphorylating agents employed in this reaction are phosphorochloridates of the formulae:

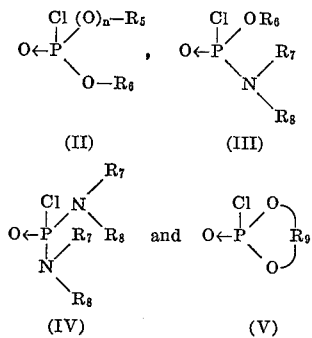

wherein $n$, $R_5$, $R_6$, $R_7$, $R_8$ and $R_9$ are as defined in Formula I, above, provided that $R_6$ in Formulas II and III is alkyl or aryl. These phosphorochloridates are well-known compounds and are either available commercially or may be prepared by methods already described in the literature.

The phosphorylation reaction may be carried out by heating at reflux a mixture of the benzimidazole alkali metal salt and the desired phosphorochloridate in a suitable organic solvent such as, for example, acetonitrile, dimethylformamide, dimethylsulfoxide, benzene and the like. Although heating the reaction mixture is desirable, it is not essential to the reaction which will proceed at room temperature. Desirably, the reaction is carried out under an inert atmosphere. Upon completion of the reaction, which usually requires from 2 to 72 hours, the solvent may be removed under reduced pressure and the crude phosphorylated benzimidazole may be separated from the residue by filtration and purified by conventional recrystallization techniques.

Where the starting benzimidazole employed in the reaction described above is unsubstituted in the 5(6)-position, the introduction of the phosphinyl group at the 1-position does not destroy the symmetry of the molecule and the phosphorylated benzimidazole is obtained as a single product. It will be understood by those skilled in the art that where the starting benzimidazole is substituted in the 5(6)-position, introduction of the phosphinyl group at the 1-position destroys the symmetry of the benzimidazole nucleus so that the product of the reaction is obtained as a mixture of isomers. Thus, for example, when a benzimidazole such as 5-isopropoxycarbonylamino-2-(4'-thiazolyl)benzimidazole is subjected to phosphorylation by the technique described above, and using diisopropyl phosphorochloridate as the phosphorylating agent, the product is obtained as a mixture of 1-diisopropoxyphosphinyl - 5 - isopropoxycarbonylamino-2-(4'-thiazolyl)benzimidazole and 1 - diisopropoxyphosphinyl-6-isopropoxycarbonylamino - 2 - (4'-thiazolyl)benzimidazole. Although not necessary to the use as anthelmintic agents and as fungicides, the individual isomers can be separated by conventional chromatographic techniques or by conventional fractional recrystallization.

Representative examples of the anthelmintically and fungicidally active benzimidazole which may be prepared by the techniques described above will include; for example:

1-di-n - propoxyphosphinyl-2-(4'-thiazolyl)benzimidazole prepared from 2-(4'-thiazolyl)benzimidazole sodium salt and di-n-propyl phosphorochloridate, 1-diethoxyphosphinyl - 2 - (2'-furyl)benzimidazole, prepared from 2-(2'-furyl)benzimidazole potassium salt and diethyl phosphorochloridate, 1-diisopropoxyphosphinyl - 2-(4'-thiazolyl)benzimidazole prepared from 2-(4'-thiazolyl)benzimidazole sodium salt and diisopropyl phosphorochloridate, 1-diphenoxyphosphinyl - 2 - (4' - thiazolyl)benzimidazole prepared from 2-(4'-thiazolyl)benzimidazole and diphenyl phosphorochloridate, 1 - diisopropoxyphosphinyl - 5(6) - isopropoxycarbonylamino - 2-(4'-thiazolyl)benzimidazole prepared from 5-isopropoxycarbonylamino - 2 - (4'-thiazolyl)benzimidazole and diisopropyl phosphorochloridate, 1-ethylethoxyphosphinyl - 2 - (4'-thiazolyl)benzimidazole prepared from 2-(4'-thiazolyl)benzimidazole sodium salt and ethyl ethylphosphonochloridate, 1-methylbutoxyphosphinyl - 2-(2' - furyl)benzimidazole prepared from 2-(2'-furyl)benzimidazole potassium salt and butyl methylphosphonochloridate, 1-N,N-dimethylaminoethoxyphosphinyl - 2 - (4'-thiazolyl)benzimidazole prepared from 2-(4'-thiazolyl)benzimidazole sodium salt and ethyl N,N-dimethylphosphoramidochloridate, 1-N'-methylaminoisopropoxyphosphinyl - 2 - (2'-furyl)benzimidazole prepared from 2-(2'-furyl)benzimidazole lithium salt and isopropyl N-methylphosphoramidochloridate, 1-N-ethylaminobutoxyphosphinyl - 2-(2'-furyl)benzimidazole prepared from 2-(2'-furyl)benzimidazole potassium salt and n-butyl N-ethylphosphoramidochloridate, 1-bis-dimethylaminophosphinyl-2 - (4'-thiazolyl)benzimidazole prepared from 2-(4'-thiazolyl)benzimidazole sodium salt and N,N'-tetramethylphosphorodiamidic chloride, 1-N,N-diethylamino - N',N'-diisopropylaminophosphinyl-2-(4'-thiazolyl)benzimidazole prepared from 2-(4'-thiazolyl)benzimidazole sodium salt and N,N-diethyl-N',N'-diisopropylphosphorodiamidic chloride, 1-ethylenedioxyphosphinyl - 2 - (4'-thiazolyl)benzimidazole prepared from 2-(4'-thiazolyl)benzimidazole sodium salt and ethylenephosphorochloridate, 1-propylenedioxyphosphinyl - 2-(4' - thiazolyl)benzimidazole prepared from 2-(4'-thiazolyl)benzimidazole potassium salt and propylene phosphorochloridate, 1-diethoxyphosphinyl - 2-(4'-thiazolyl)benzimidazole prepared from 2-(4'-thiazolyl)benzimidazole sodium salt and diethyl phosphorochloridate, 1-di-n-octyloxyphosphinyl - 2-(4'-thiazolyl)benzimidazole prepared from 2-(4'-thiazolyl)benzimidazole sodium salt and di-n-octyl phosphorochloridate, 1-diethoxyphosphinyl-5(6) - benzamido-2-(4'-thiazolyl) benzimidazole prepared from 5-benzimido-2-(4'-thiazolyl)benzimidazole sodium salt and diethyl phosphorochloridate, 1-diisopropoxyphosphinyl-5(6) - parafluorobenzamido-2-(4'-thiazolyl)benzimidazole prepared from 5-parafluorobenzamido-2 - (4'-thiazolyl)benzimidazole sodium salt and diisopropyl phosphorochloridate, 1-di-n-propoxyphosphinyl - 2-(2'-thiazolyl)benzimidazole prepared from 2-(2'-thiazolyl)benzimidazole lithium salt and di-n-propyl phosphorochloridate, 1-diethoxyphosphinyl - 2-(2'-thienyl)benzimidazole prepared from 2-(2'-thienyl)benzimidazole potassium salt and diethyl phosphorochloridate, 1-diisopropoxyphosphinyl - 2-(3'-pyridyl)benzimidazole prepared from 2-(3'-pyridyl)benzimidazole lithium salt and diisopropyl phosphorochloridate, 1-di-n-octyloxyphosphinyl - 2-(3'-isothiazolyl)benzimidazole prepared from 2-(3'-isothiazolyl)benzimidazole potassium salt and di-n-octyl phosphorochloridate, 1-diphenoxyphosphinyl-2-(2' - pyrazinyl)benzimidazole prepared from 2-(2'-pyrazinyl)benzimidazole potassium salt and diphenyl phosphorochloridate, 1-N,N-dimethylaminoethoxyphosphinyl - 2-(2'-oxazolyl) benzimidazole prepared from 2-(2'-oxazolyl)benzimidazole sodium salt and ethyl-N,N-dimethylphosphoramidochloridate, 1-methylbutoxyphosphinyl - 2-(1',3',4'-thiadiazolyl)benzimidazole prepared from 2-(1',3',4'-thiadiazolyl)benzimidazole lithium salt and butyl methylphosphonochloridate, 1-di-n-propoxyphosphinyl - 2-(1',2',5'-thiadiazolyl)benzimidazole prepared from 2-(1',2',5'-thiadiazolyl)benzimidazole lithium salt and di-n-propylphosphorochloridate, 1-diethoxyphosphinyl - 2-(3'-thienyl)benzimidazole prepared from 2-(3'-thienyl)benzimidazole potassium salt and diethyl phosphorochloridate, 1-diisopropoxyphosphinyl - 2-(3'-pyridyl)benzimidazole prepared from 2-(3'-pyridyl)benzimidazole sodium salt and diisopropyl phosphorochloridate, 1-diisopropoxyphosphinyl - 2-(4'-isothiazolyl)benzimidazole prepared from 2-(4'-isothiazolyl)benzimidazole lithium salt and diisopropyl phosphorochloridate, and 1-diethoxyphosphinyl - 2 - (1'-pyrazolyl)benzimidazole prepared from 2-(1'-pyrazolyl)benzimidazole sodium salt and diethylphosphorochloridate.

Although the addition of the phosphinyl group at the 1-position by the techniques described above involves first the formation of an alkali metal salt of the parent 1-unsubstituted benzimidazole followed by phosphorylation of the benzimidazole alkali metal salt, it is not essential that the benzimidazole alkali metal salt be isolated per se and that the salt formation and phosphorylation be carried out in separate steps. After formation of the alkali metal salt, it may be treated in situ and without isolation with the phosphorylating agents described above so as to introduce the desired phosphinyl group at the 1-position. Conveniently, this reaction may be carried out by adding the parent 1-unsubstituted benzimidazole to a stirred suspension of an alkali metal hydride such as, for example, sodium hydride, potassium hydride or lithium hydride, in a suitable organic solvent such as dimethyl formamide, dimethyl sulfoxide or benzene. The reaction mixture is heated, desirably under an inert atmosphere, to about 70° C. to reflux for one to two hours. The reaction mixture is then cooled to about 10 to about 20° C. and the desired phosphorylating agent is added. Stirring at room temperature to about 50° C. is continued for 1 to 4 hours and the reaction mixture is then concentrated under reduced pressure and the residue is poured into ice water. The mixture is then extracted with a suitable organic solvent such as methylene chloride and the crude product is recovered and purified by conventional techniques.

The phosphorylated benzimidazoles as prepared by the techniques described above, i.e. those benzimidazoles of this invention having a phosphinyl group at the 1-position, in addition to their utility as anthelmintic agents and as fungicides serve also as convenient intermediates in the preparation of those benzimidazoles of this invention wherein the substituent X in Formula I, above, is sulfur, i.e. those benzimidazoles of this invention having a phosphinothioyl group in the 1-position. Applicants have found that benzimidazoles as disclosed above having a phosphinyl group in the 1-position are readily converted into the corresponding benzimidazole having a phosphinothioyl group in the 1-position by treating the starting benzimidazole with phosphorus pentasulfides according to the technique to be described below. Any of the phosphorylated benzimidazoles of Formula I above wherein X is oxygen and $R_3$ is hydrogen may be employed as the starting material; the product in each case being the corresponding benzimidazole wherein X is sulfur.

This reaction may be carried out by heating a mixture of the starting benzimidazole and phosphorus pentasulfide at about 160° C. for 3 to 8 hours. At this temperature, the phosphorus pentasulfide melts and the reaction is carried out in the melt without addition of a solvent. Upon completion of the reaction, which desirably is carried out under an inert atmosphere, the reaction mixture is cooled and extracted with benzene. The extract is then evaporated under reduced pressure to obtain the desired 1-phosphinothioyl benzimidazole.

Typical benzimidazoles of this invention having a phosphinothioyl group at the 1-position, and which may be prepared from the corresponding 1-phosphinyl benzimidazole as described above, include, for example:

1-bis-dimethylaminophosphinothioyl-2-(4'-thiazolyl) benzimidazole, 1-di-n-propoxyphosphinoethioyl-2-(4'-thiazolyl) benzimidazole, 1-diisopropoxyphosphinothioyl-2-(4'-thiazolyl) benzimidazole, 1-diisopropoxyphosphinothioyl-2-(2'-furyl) benzimidazole, 1-di-n-octyloxyphosphinothioyl-2-(2'-furyl) benzimidazole, 1-ethylethoxyphosphinothioyl-2-(4'-thiazolyl) benzimidazole, 1-N,N-dimethylaminoethoxyphosphinothioyl-2-(4'-thiazolyl)benzimidazole, 1-ethylenedioxyphosphinothioyl-2-(4'-thiazolyl) benzimidazole, 1-diethoxyphosphinothioyl-2-(4'-thiazolyl) benzimidazole, 1-N-ethylaminobutoxyphosphinothioyl-2-(4'-thiazolyl) benzimidazole, 1-bis-dimethylaminophosphinothioyl-2-(2'-thienyl) benzimidazole, 1-di-n-propoxyphosphinothioyl-2-(2'-pyridyl) benzimidazole, 1-diisopropoxyphosphinothioyl-2-(3'-isothiazolyl) benzimidazole 1-di-n-octyloxyphosphinothioyl-2-(2'-pyrazinyl) benzimidazole 1-ethylethoxyphosphinothioyl-2-(2'-oxazolyl) benzimidazole and 1-diisopropoxyphosphinothioyl-2-(1',3',4'-thiadiazolyl) benzimidazole.

Applicants have found that those benzimidazoles of this invention wherein the substituent, $R_6$, in Formula I above is alkyl are readily converted into the corresponding mono-alkali metal salt, i.e. those compounds wherein $R_6$ is an alkali metal, by treating the starting benzimidazole with an alkali metal halide such as, for example, sodium iodide, lithium chloride, lithium bromide, sodium bromide and the like. The reaction may be carried out by adding the starting benzimidazole to a solution of an alkali metal halide in a suitable organic solvent such as, for example, butanone, acetone, methanol, ethanol, isopropanol and the like, and heating the mixture under reflux, desirably in an inert atmosphere, for 2 to 6 hours. The precipitated solids are then separated from the reaction mixture by filtration, dissolved in water, and the pH of the aqueous solution is adjusted to about 8.5. The solution is filtered and concentrated to dryness by conventional techniques, such as by freeze drying, to obtain the desired alkali metal salt. Where desired, the mono-ammonium and mono-loweralkyl ammonium salts of the starting benzimidazole may be prepared by the same technique, substituting for the alkali metal halide used above an ammonium halide or a loweralkyl ammonium halide such as, for example, ammonium iodide, methylammonium iodide, ethylammonium bromide, dimethylammonium iodide, trimethylammonium chloride, triethylammonium iodide, tetramethylammonium iodide and the like.

Typical of the salts prepared by the techniques described are, for example:

1-n-propoxyhydroxyphosphinyl-2-(4'-thiazolyl) benzimidazole sodium salt,
1-ethoxyhydroxyphosphinyl-2-(4'-thiazolyl) benzimidazole potassium salt,
1-ethoxyhydroxyphosphinyl-2-(2'-furyl) benzimidazole potassium salt,
1-isopropoxyhydroxyphosphinyl-2-(4'-thiazolyl) benzimidazole sodium salt,
1-isopropoxyhydroxyphosphinyl-5(6)-isopropoxycarbonylamino-2-(4'-thiazolyl)benzimidazole sodium salt,
1-ethylhydroxyphosphinyl-2-(4'-thiazolyl) benzimidazole sodium salt,
1-N,N-dimethylaminohydroxyphosphinyl-2-(4'-thiazolyl)benzimidazole sodium salt,
1-N-methylaminohydroxyphosphinyl-5(6)-benzamido-2-(4'-thiazolyl)benzimidazole lithium salt,
1-N-ethylaminohydroxyphosphinyl-2-(2'-furyl) benzimidazole ammonium salt,
1-n-octyloxyhydroxyphosphinyl-2-(4'-thiazolyl) benzimidazole sodium salt,
1-n-hexylhydroxyphosphinyl-2-(4'-thiazolyl) benzimidazole tetramethylammonium salt,
1-ethoxyhydroxyphosphinothioyl-2-(4'-thiazolyl) benzimidazole sodium salt,
1-isopropoxyhydroxyphosphinothioyl-2-(4'-thiazolyl) benzimidazole sodium salt,
1-isopropoxyhydroxyphosphinothioyl-5(6)-isopropoxycarbonylamino-2-(4'-thiazolyl)benzimidazole sodium salt,
1-n-octyloxyhydroxyphosphinothioyl-2-(2'-furyl) benzimidazole lithium salt,
1-ethoxyhydroxyphosphinyl-2-(2'-thienyl) benzimidazole ammonium salt,
1-isopropoxyhydroxyphosphinyl-2-(4'-isothiazolyl) benzimidazole tetramethylammonium salt and
1-n-octyloxyhydroxyphosphinyl-2-(1'-pyrazolyl) benzimidazole sodium salt.

While all of the 1-phosphorylated benzimidazoles of this invention display anthelmintic and fungicidal activity as disclosed above, it will be obvious, of course, that these compounds will display varying degrees of potency depending upon the nature of the particular application contemplated and of the infestation to be combatted. Of particular interest in antifungal applications, are those benzimidazoles of this invention wherein the substituent $R_2$ in Formula I above is thienyl, furyl, thiazolyl, isothiazolyl and 1-pyrazolyl. In general, the most preferred benzimidazoles of this invention are those compounds of Formula I wherein $R_2$ is thiazolyl, $R_3$ is hydrogen and X is oxygen. Of this group, the benzimidazoles particularly preferred are those wherein $R_5$ is alkyl, $R_6$ is alkyl or an alkali metal and $n$ is one.

When the benzimidazoles of this invention are employed for the treatment and control of helminthiasis, the specific means employed for administering the benzimidazole to the animal is not critical and any of the methods now used or available for treating animals infected with, or susceptible to infection by helminths are satisfactory. Where it is desired to administer the benzimidazole in dry, solid unit dosage form, capsules, boluses or tablets containing the desired amount of benzimidazole usually are employed. These dosage forms are prepared by intimately and uniformly mixing the active ingredient with suitable finely divided diluents, fillers, disintegrating agents and/or binders such as starch, lactose, talc, magnesium stearate, vegetable gums and the like. Such unit dosage formulations may be varied widely with respect to their total weight and content of anthelmintic agent depending upon factors such as the type of host animal to be treated, the severity and type of infection and the weight of the host. For large animals such as sheep, swine and cattle, unit dosages up to 15 gm., containing from 3 to 12 gm. of benzimidazole, may be employed. It is usually preferred however, to employ unit dosages weighing from 5 to 10 gm. containing from 2 to 8 gm. of benzimidazole. Boluses as well as smaller size tablets contain various binders and lubricants and are compounded by techniques well-known in the art. Capsules are prepared readily by mixing the active ingredient with a diluent such as starch or lactose and filling into the capsule.

In order to treat infected animals by means of a drench, the 1-phosphorylated benzimidazoles of this invention are mixed with a suspending agent such as bentonite and the solid mix is added to water just prior to administration. Alternatively, ready to use drench formulations, such as those described in U.S. Pat. No. 2,918,403, may be employed. Preferred drench formulations containing from about 5 to 50% by weight of the benzimidazole.

The benzimidazoles described herein also may be administered as a component of the feed of the animals or may be dissolved or suspended in the drinking water. Such compositions comprise the benzimidazole intimately dispersed in an inert carrier of diluent. By inert carrier, is meant one that will not react with the benzimidazole and one that may be administered safely to animals. Preferably, the carrier is one that it, or may be, an ingredient of the animal ration.

Suitable compositions include feed supplements in which the active ingredient is present in relatively large amounts and which are suitable for addition to the feed either directly or after an intermediate dilution or blending step. Typical carriers or diluents suitable for such compositions include, for example, distillers' dried grains, corn meal, citrus meal, fermentation residues, ground oyster shells, wheat shorts, molasses solubles, corn cob meal, edible bean mill feed, soya grits, crushed limestone and the like. The active benzimidazoles are intimately dispersed throughout the carrier by methods such as grinding, stirring, milling or tumbling. Compositions containing from about 5 to 50% by weight of the benzimidazole are particularly suitable as feed additives.

Examples of typical feed supplements containing the benzimidazoles of this invention dispersed in a solid carrier are:

|  | Lbs. |
|---|---|
| (A) 1 - diethoxyyphosphinyl - 2 - (4'-thiazolyl)benzimidazole | 20 |
| Corn distiller's dried grains | 80 |
| (B) 1-diisopropoxyphosphinyl - 2 - (4'-thiazolyl)benzimidazole | 5 |
| Wheat Standard Middling | 95 |
| (C) 1-diisopropoxyphosphinyl - 2 - (4'-thiazolyl)benzimidazole | 35 |
| Wheat shorts | 65 |
| (D) 1 - diisopropoxyphosphinyl-5(6)-isopropoxycarbonylamino-2-(4'-thiazolyl)benzimidazole | 50 |
| Corn distiller's grains | 50 |

These, and similar feed supplements, are prepared by uniformly mixing the benzimidazole with the carrier.

Such supplements are added to the animal feed in an amount to give the finished feed the concentration of benzimidazole desired for the treatment and control of helminthiasis. Although the desired concentration of the active will vary depending upon the factors previously mentioned as well as upon the particular benzimidazole employed, the benzimidazoles of this invention are usually fed at concentrations of between 0.5 to 2.0% in the feed in order to achieve the desired anthelmintic result.

The benzimidazoles of this invention are effective fungicides in a variety of applications. Accordingly, they may be employed as fungicides by conventional techniques in the protection of plants, soils, fruits, seeds, fur, wood, paint, textiles, cosmetics, leather, tobacco, rope, paper, pulp, plastic, fuel, rubber, food and the like.

It should be understood that the benzimidazole compounds may be utilized in diverse formulations, solid, including finely divided powders and granular materials as well as liquid, such as solutions, emulsions, suspensions, concentrates, emulsifiable concentrate, slurries and the like, depending upon the application intended and the formulation media desired. Thus, it will be appreciated that benzimidazoles of this invention may be employed to form fungicidally active compositions containing such compounds as essentially active ingredients thereof, which compositions may also include finely divided dry or liquid diluents, extenders, fillers, conditioners and excipients, including various clays, diatomaceous earth, talc, and the like, or water and various organic liquids such as loweralkanols, for example ethanol and isopropanol, or kerosene, benzene, toluene and other petroleum distillate fractions or mixtures thereof. The quantity of active benzimidazole contained in such formulations will vary widely depending upon the particular benzimidazole employed and the particular application intended. In general, useful formulations will contain from about 1 to about 95% of the active benzimidazole.

It should be understood also that the benzimidazoles of the invention may be used in combination one with the other as well as with other fungicidally active materials. For instance, the benzimidazoles disclosed above may be mixed with sorbic acid or its salts, propionic acid or its salts, mycostatin, trichomycin, amphotercin, griseofulvin, undecylenic acid, 8-hydroxyquinoline and chlorinated derivatives thereof, sodium o-phenylphenate, o-phenylphenol, biphenyl, chlorinated phenols, sodium benzoate, dehydroacetic acid and its salts or esters of 4-hydroxybenzoic acid, such as the methyl and propyl ester to give added fungicidal effect when used in appropriate concentrations. It is quite clear, too, that the benzimidazoles of this invention may be used in conjunction with effective antibacterial materials in appropriate instances so as to combine the action of each in such a situation as to be particularly useful, for instance, in applications where the presence of bacteria creates undesirable results alongside the detrimental action of fungi. Accordingly, a combination of antifungal and antibacterial agents will be useful in the preparation of germicidal soaps, in the production of cosmetics, and in food, such as beer, cheese, or meat and other leather applications.

It has been found that growth of various fungi existing in soil is limited or terminated by the addition to the soil of minor quantities of the benzimidazole compounds described. The term soil as used herein is intended to include all media capable of supporting the growth of plants and may include humus, sand, manure, compost, artificially created plant growth solution, and the like. It has been found also that the benzimidazoles of the invention are effective against fungal diseases of plants and may be effectively used either by direct contact with the foliage or systemically, by introduction through the roots.

The compounds of this invention also have activity against bacteria and plant nematodes and may, at appropriate levels of concentration, be effectively used to inhibit or prevent the growth of these organisms.

As fungicides, the benzimidazoles of the present invention are useful in inhibiting mold growth in fruit such as citrus fruit. The active agent may be applied at any time before consumption and preferably after harvesting. For instance, the antifungal may be applied during initial storage, before or after shipping or during final storage before consumption. The benzimidazoles may be utilized in a number of ways in this regard and may be applied either directly to the fruit in an emulsion, solution, suspension or the like or it may be applied to the fruit container or wrapper. Suitable carriers for the active agents are waxes and other materials presently known in the art.

The best mode contemplated by applicants for carrying out their invention is set forth in the following examples; it being understood that these examples are for purposes of illustration merely and no limitation is intended except as set forth in the appended claims.

EXAMPLE 1

Thiabenzimidazole sodium salt

To a suspension of 80.4 g. of 2-(4'-thiazolyl)benzimidazole in 1.6 l. of dry methanol, add 83 ml. of 4.82 M sodium methoxide in methanol. Heat the mixture under reflux in a nitrogen atmosphere for 30 minutes. Remove approximately 1.2 l. of methanol under reduced pressure and remove the remaining methanol by azeotropic distillation with benzene. Filter the resulting slurry under a nitrogen atmosphere and dry the recovered product in a vacuum oven at 60° C. to obtain the sodium salt of 2-(4'-thiazolyl)benzimidazole (M.P. 330° C.).

It will be appreciated by those skilled in the art that any benzimidazole having the substituents $R_2$ and $R_3$ as defined in Formula I above, and which is unsubstituted in the 1-position, may be treated in accordance with the technique of Example 1 with an alkali metal alkoxide to form the alkali metal salt of the parent benzimidazole.

EXAMPLE 2

1-bis-dimethylaminophosphinyl-2-(4'-thiazolyl)benzimidazole

Heat a mixture of 5.6 g. of the sodium salt 2-(4'-thiazolyl)benzimidazole and 4.3 g. of N,N'-tetramethylphosphorodiamidic chloride in 100 ml. of dry acetonitrile under reflux in a nitrogen atmosphere for 23 hours. Cool and filter the reaction mixture. Evaporate the filtrate under reduced pressure and recrystallize the residue from methylene chloride-hexane to obtain 1-bis-dimethylaminophosphinyl-2-(4' - thiazolyl)benzimidazole (M.P. 138–140° C.).

EXAMPLE 3

1-ethylethoxyphosphinyl-2-(4'-thiazolyl)benzimidazole

To a suspension of 2.23 g. of 2-(4'-thiazolyl)benzimidazole sodium salt in 40 ml. of dry acetonitrile, add all at once 1.57 g. of ethyl ethylphosphonochloridate. Heat the reaction mixture under reflux in a nitrogen atmosphere for 3 hours. Cool and filter the reaction mixture. Evaporate the reaction mixture under reduced pressure. Add 15 ml. of chloroform to the residue and filter. Evaporate the filtrate under reduced pressure to obtain 2.83 g. of 1-ethylethoxyphosphinyl-2-(4'-thiazolyl)benzimidazole as a yellow oil.

EXAMPLE 4

1-ethylenedioxyphosphinyl-2-(4'-thiazolyl)benzimidazole

To a suspension of 4.46 g. of the sodium salt of 2-(4'-thiazolyl)benzimidazole in 80 ml. of dry acetonitrile, add all at once 2.85 g. of ethylenephosphorochloridate. Stir the reaction mixture at room temperature in a nitrogen atmosphere 66 hours and filter. Evaporate the filtrate under reduced pressure. Dissolve the residue in 30 ml. of chloroform and filter. Evaporate the filtrate to obtain 1-ethylenedioxyphosphinyl-2-(4'-thiazolyl)benzimidazole as an orange foam.

EXAMPLE 5

1-N,N-dimethylaminoethoxyphosphinyl-2-(4'-thiazolyl)benzimidazole

To a suspension of 2.23 g. of 2-(4'-thiazolyl)benzimidazole sodium salt in 40 ml. of dry acetonitrile, add all at once 1.72 g. of N,N-dimethylethylphosphoroamidochloridate. Heat the reaction mixture under reflux in a nitrogen atmosphere for 8 hours, cool and filter. Evaporate the reaction mixture under reduced pressure and dissolve the residue in 15 ml. of chloroform. Filter the mixture and evaporate under reduced pressure to obtain 1-N,N-dimethylaminoethoxyphosphinyl-2-(4' - thiazolyl) benzimidazole.

EXAMPLE 6

1-diisopropoxyphosphinyl-2-(4'-thiazolyl)benzimidazole

To a stirred suspension of 17.8 gm. of a 57% sodium hydride dispersion in 1100 ml. of dry DMF, add 88.8 g. of 2-(4'-thiazolyl)benzimidazole. Stir the reaction mixture at room temperature in a nitrogen atomsphere for 15 minutes and heat to 90° C. for 45 minutes. Cool the reaction mixture to 15° C. and add 89.0 g. of diisopropyl-phosphorochloridate. Continue stirring at room temperature for 1 hour and then at 45° C. for an additional 1.5 hours. Concentrate the reaction mixture under reduced pressure and pour the residue into ice water. Extract with methylene chloride and filter. Separate the methylene chloride and filter. Separate the methylene chloride layer from the filtrate and evaporate under reduced pressure. Purify by recrystallization from cyclohexane to obtain 1-diisopropoxyphosphinyl - 2 - (4'-thiazolyl)benzimidazole (M.P. 92–93° C.)

EXAMPLE 7

1-diisopropoxyphosphinyl-5(6)-isopropoxycarbonyl-amino-2-(4'-thiazolyl)benzimidazole To 30.2 g. of 5-isopropoxycarbonylamino - 2 - (4'-thiazolyl)benzimidazole suspended in 600 ml. of dry isopropanol, add 5.4 g. of sodium methoxide. Stir the mixture at room temperature for 15 minutes at heat for 5 minutes at 60° C. Remove most of the isopropanol under reduced pressure then remove the remainder by azeotropic distillation with benzene. Suspend the dry sodium salt of 5-isopropoxycarbonylamino-2-(4'-thiazolyl)benzimidazole so produced in 800 ml. of dry acetonitrile and add 20.2 g. of diisopropylphosphorochloridate. Heat the mixture under reflux for 16 hours, cool and filter. Evaporate the filtrate under reduced pressure. Dissolve the residue in methylene chloride-cyclohexane and filter. Evaporate the solvent to obtain the product as a mixture of 1-diisopropoxyphosphinyl - 5 -isopropoxycarbonylamino-2-(4'-thiazolyl)benzimidazole and 1 - diisopropoxyphosphinyl-6-isopropoxycarbonylamino - 2 - (4' - thiazolyl)benzimidazole. Fractional recrystallization from methylene chloride-petroleum ether separated the isomers. (M.P. less soluble isomer 168–172° C.) (M.P. more soluble isomer 141–145° C.).

EXAMPLE 8

1-diphenoxyphosphinyl-2-(4'-thiazolyl)benzimidazole

To a suspension of 2.5 g. of the sodium salt of 2-(4'-thiazolyl)benzimidazole in 40 ml. of dry acetonitrile at 10° C. under a nitrogen atmosphere, add 13.43 g. of diphenyl phosphorochloridate. Heat the reaction mixture to 90° C. for 2.5 hours. Cool the reaction mixture and filter. Evaporate under reduced pressure. Recrystallize the residue from ethyl acetate to obtain 1-diphenoxyphosphinyl - 2 - (4'-thiazolyl)benzimidazole (M.P. 153–158° C.).

Any of the benzimidazoles of this invention wherein the substituent X in Formula I above is oxygen may be prepared by the techniques described in Examples 2–8 merely by treating an appropriately substituted benzimidazole alkali metal salt with any of the phosphorylating agents defined in Formulas II–V.

EXAMPLE 9

1-diisopropoxyphosphinothioyl-2-(4'-thiazolyl)benzimidazole

Heat a mixture of 3.65 g. of diisopropoxyphosphinyl-2-(4'-thiazolyl)benzimidazole and 1.11 g. of phosphorous pentasulfide at 160° C. for 5 hours in a nitrogen atmosphere. Cool the reaction mixture and extract several times with warm benzene. Evaporate the extracts under reduced pressure to obtain 1-diisopropoxyphosphinothioyl-2-(4'-thiazolyl)benzimidazole.

The process described in Example 9 is applicable in general to the preparation of any of the benzimidazoles of this invention wherein the substituent X in Formula I is sulfur and the substituent $R_3$ is hydrogen. In order to prepare the desired 1 - phosphinothioylbenzimidazole, therefore, it is necessary merely to select the correspondingly substituted 1-phosphinyl benzimidazole as the starting material.

EXAMPLE 10

1-N,N-dimethylaminohydroxyphosphinyl-2-(4'-thiazolyl)-benzimidazole sodium salt

To a solution of 1.65 g. of dry sodium iodide in 40 ml. of freshly distilled butanone, add 3.36 g. of 1-N,N-dimethylaminoethoxyphosphinyl - 2 - (4' - thiazolyl)-benzimidazole. Heat the reaction mixture under reflux in a nitrogen atmosphere for 3 hours. Separate the precipitate by filtration, wash with acetone and dry. Dissolve the product in 40 ml. of water and adjust the pH of the solution to 8.5 with dilute sodium hydroxide. Filter the solution and freeze dry to obtain 1-N,N-dimethylamino-hydroxyphosphinyl - 2 - (4 - thiazolyl)benzimidazole sodium salt.

EXAMPLE 11

1-isopropoxyhydroxyphosphinothioyl-2-(4'-thiazolyl)-benzimidazole sodium salt

To a solution of 1.65 g. of dry sodium iodide in 40 ml. of butanone, add 3.81 g. of 1-diisopropoxyphosphino-thionyl-2-(4'-thiazolyl)benzimidazole and heat the mixture under reflux in a nitrogen atmosphere for 3 hours. Separate the precipitated solid by filtration, wash with acetone and dry. Dissolve the product in 40 ml. of water and adjust the pH to 8.5 with dilute sodium hydroxide. Filter the solution and freeze-dry to obtain 1-isopropoxy-hydroxyphosphinothioyl - 2 - (4'-thiazolyl)benzimidazole sodium salt.

EXAMPLE 12

1-isopropoxyhydroxyphosphinyl-2-(4'-thiazolyl)benzimidazole sodium salt

Under a nitrogen atmosphere, add with stirring 28.0 g. of 1-diisopropoxyphosphinyl - 2 - (4'-thiazolyl)benzimidazole to a solution of 12.7 g. of sodium iodide in 450 ml. butanone. Heat the reaction mixture at reflux for 3 hours, cool and separate the precipitated solid by filtration. Wash the product with acetone and dry. Dissolve the product in 125 ml. of water and adjust the pH to 8.5 with dilute sodium hydroxide. Filter and freeze-dry the filtrate to obtain 1-isopropoxyhydroxyphosphinyl-2-(4' - thiazolyl)-benzimidazole sodium salt.

EXAMPLE 13

1-isopropoxyhydroxyphosphinyl - 5(6) - isopropoxycarbonylamino-2-(4'-thiazolyl)benzimidazole sodium salt To 24.2 g. of 1-diisopropoxyphosphinyl-5-(6)-isopropoxycarbonylamino-2-(4' - thiazolyl)benzimidazole, add 8.55 g. of sodium iodide in 300 ml. of dry butanone and heat under reflux in a nitrogen atmosphere for 18 hours. Cool the reaction mixture and filter. Evaporate the filtrate under reduced pressure. Dissolve the residue in 300 ml. of acetone and dilute the solution with a large volume of ether. Separate the precipitate by filtration, wash with ether and dry to obtain 1-isopropoxyhydroxy-phosphinyl-5-(6) - isopropoxycarbonylamino - 2-(4'-thiazolyl)benzimidazole sodium salt.

By employing the techniques described in Examples 10–13, and substituting for the sodium iodide employed therein any desired alkali metal halide, ammonium halide or loweralkylammonium halide, the corresponding benzimidazole alkali metal salt, ammonium salt or loweralkyl ammonium salt may be prepared.

Although the specific working examples set forth above have illustrated preparation of benzimidazoles of this invention having a triazolyl group at the 2-position, it will be obvious to those skilled in the art that benzimidazoles of this invention having at the 2-position any of the aryl, orthofluoroaryl or heteroaromatic radical as described above may be prepared merely by selecting the appropriately substituted benzimidazole as the starting material.

The subject matter which applicants regard as their invention is particularly pointed out and distinctly claimed as follows.

What is claimed is:

1. A compound selected from the group consisting of N-phosphorylated benzimidazoles of the formula:

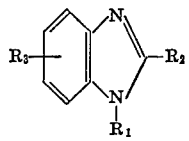

wherein:

$R_2$ is a member selected from the group consisting of phenyl, naphthyl, orthofluorophenyl, thienyl, furyl, pyridyl, thiazolyl, isothiazolyl, pyrazinyl, 1-pyrazolyl, oxazolyl, or thiadiazolyl;

$R_3$ is in the 5(6)-position of the molecule and is a member selected from the group consisting of hydrogen and

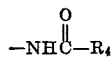

$R_4$ is a member of the group consisting of loweralkoxy, phenyl and parafluorophenyl;

$R_1$ is a member selected from the group consisting of:

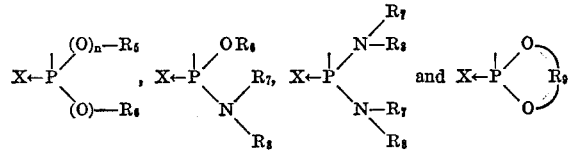

$n$ is a whole number from 0 to 1;

$R_5$ is a member selected from the group consisting of alkyl phenyl and naphthyl;

$R_6$ is a member selected from the group consisting of alkyl of from 2 to 10 carbon atoms, phenyl, naphthyl, an alkali metal, ammonium and loweralkyl ammonium;

$R_7$ and $R_8$ are members selected from the group consisting of hydrogen and loweralkyl, provided that at least one of $R_7$ and $R_8$ is loweralkyl;

$R_9$ is a loweralkylene radical of from 2 to 4 carbon atoms; and

X is a member selected from the group consisting of oxygen and sulfur, provided that when X is sulfur $R_3$ is hydrogen.

2. A compound of claim 1 wherein $R_2$ is thiazolyl and X is oxygen.

3. A compound of claim 2 wherein $R_3$ is hydrogen, $R_5$ is alkyl, $R_6$ is alkyl or an alkali metal and $n$ is one.

4. 1 - diisopropoxyphosphinyl - 2 - (4' - thiazolyl) benzimidazole.

5. 1 - isopropoxyhydroxyphosphinyl - 2 - (4'-thiazolyl) benzimidazole sodium salt.

6. 1 - diisopropoxyphosphinyl - 5(6) - isopropoxycarbonylamino-2-(4'-thiazolyl) benzimidazole.

7. 1 - isopropoxyhydroxyphosphinyl - 5(6) - isopropoxycarbonylamino - 2 - (4' - thiazolyl) benzimidazole sodium salt.

8. 1 - isopropoxyhydroxyphosphinyl - 2 - (4'-thiazolyl) benzimidazole potassium salt.

9. 1 - diethoxyphosphinyl - 2 - (2'-furyl) benzimidazole.

References Cited
UNITED STATES PATENTS
3,535,331  10/1970  Glamkowski _____ 260—302 E RICHARD J. GALLAGHER, Primary Examiner U.S. Cl. X.R.

260—250 R, 296 B, 307 R, 309.2; 424—200